United States Patent
Uehara

(10) Patent No.: US 8,075,193 B2
(45) Date of Patent: Dec. 13, 2011

(54) BEARING

(75) Inventor: Junji Uehara, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 900 days.

(21) Appl. No.: 12/054,568

(22) Filed: Mar. 25, 2008

(65) Prior Publication Data

US 2008/0240636 A1   Oct. 2, 2008

(30) Foreign Application Priority Data

Mar. 27, 2007   (JP) ................ 2007-080707

(51) Int. Cl.
    *F16C 35/00* (2006.01)
(52) U.S. Cl. ........................... 384/440; 384/442
(58) Field of Classification Search .......... 384/416–419, 384/428–430, 435, 439–443; 403/1
    See application file for complete search history.

(56) References Cited

U.S. PATENT DOCUMENTS

| | | | | |
|---|---|---|---|---|
| 4,105,267 A | * | 8/1978 | Mori | ............................ 384/291 |
| 4,358,165 A | * | 11/1982 | Julius et al. | .................... 384/215 |

FOREIGN PATENT DOCUMENTS

| | | | |
|---|---|---|---|
| JP | 54-88450 | | 12/1977 |
| JP | 56-131019 | | 10/1981 |
| JP | 57-006127 | | 1/1982 |
| JP | 58091920 | * | 6/1983 |
| JP | 62-191175 | | 8/1987 |
| JP | 64-017024 | | 1/1989 |
| JP | 4-134926 U | | 12/1992 |
| JP | 7-269561 A | | 10/1995 |
| JP | 07-310735 | | 11/1995 |
| JP | 07-310736 | | 11/1995 |
| JP | 08-242741 | | 9/1996 |
| JP | 05-092846 | | 4/2003 |

OTHER PUBLICATIONS

JP Office Action dtd Mar. 30, 2011, JP Appln. 2007-080707, partial English translation.

* cited by examiner

*Primary Examiner* — James Pilkington
(74) *Attorney, Agent, or Firm* — Banner & Witcoff, Ltd

(57) ABSTRACT

A bearing includes a first bearing portion, a second bearing portion, and a connection portion. The first bearing portion assumes a generally C-like shape and opens in a first direction perpendicular to the rotational center axis. The second bearing portion assumes a generally C-like shape and opens in a second direction opposite the first direction. A gap is formed between the first and second bearing portions along the rotational center axis. The connection portion connects the first and second bearing portions at a position opposite the gap with respect to the rotational center axis.

13 Claims, 15 Drawing Sheets

BEARING

CROSS-REFERENCE TO RELATED APPLICATION

This application claims priority from Japanese Patent Application No. 2007-80707, filed on Mar. 27, 2007, the entire subject matter of which is incorporated herein by reference.

BACKGROUND OF THE INVENTION

1. Field of the Invention

The present invention relates to a bearing configured to support a shaft for rotation about a predetermined rotational center axis and to be attachable to a member to which the bearing is to be mounted (hereinafter referred to as a "mount member").

2. Description of the Related Art

Bearings are used in various portions of various apparatuses. With resent downsizing of various apparatuses and enhancement of their performances, demand has arisen for improvement of bearings, such as downsizing and strengthening of shaft-holding force.

For example, an image forming apparatus, such as a laser printer, uses a large number of relatively long rollers (longer than 210 mm, which is the width of an A4 sheet). When bearings which rotatably support such rollers cannot provide proper shaft-holding forces, malfunction may occur in an image forming operation. Meanwhile, increasing the sizes of bearings for strengthening their shaft-holding forces runs contrary to the recent demand for downsizing of image forming apparatuses.

Further, when a bearing is designed such that assembly or attachment of a shaft to the bearing becomes easier, in many cases, the shaft-holding force of the bearing decreases. Meanwhile, when an attempt is made to strengthen the bearing-holding force, in many cases, assembly of the shaft into the bearing becomes difficult.

Incidentally, various bearing structures are known (see, for example, Japanese Patent Application Laid-Open (kokai) No. H7-310735, the microfilm of Japanese Utility Model Application No. S62-111226 (Japanese Utility Model Application Laid-Open (kokai) No. S64-17024), the microfilm of Japanese Utility Model Application No. S55-29016 (Japanese Utility Model Application Laid-Open (kokai) No. S56-131019), and the microfilm of Japanese Utility Model Application No. S52-163277 (Japanese Utility Model Application Laid-Open (kokai) No. S54-88450).

SUMMARY OF THE INVENTION

An object of the present invention is to provide a bearing which can be readily assembled onto a shaft and which has a sufficient shaft-holding force.

A bearing according to the present invention is configured to support a shaft for rotation about a predetermined rotational center axis and to be attachable to a mount member. The bearing includes a first bearing portion, a second bearing portion, a connection portion, and an engagement portion.

The first bearing portion assumes a generally C-like shape and opens in a first direction perpendicular to the rotational center axis.

The second bearing portion assumes a generally C-like shape and opens in a second direction different from the first direction (e.g., the second direction being opposite the first direction or perpendicular to the first direction). The second bearing portion is disposed such that a gap is formed between the first and second bearing portions along the rotational center axis.

The connection portion connects the first and second bearing portions at a position opposite the gap with respect to the rotational center axis.

The engagement portion is configured for engagement with the mount member. This engagement portion is provided on the first bearing portion, the second bearing portion, or the connection portion.

The gap may be formed such that the shaft can pass through the gap. Alternatively, the gap may be formed to have a width equal to or greater than the opening widths of the first and second bearing portions.

In the bearing of the present embodiment having the above-described structure, the shaft is held from different directions (e.g., nipped from both sides) by the first bearing portion and the second bearing portion located at a position offset from the first bearing portion along the rotational center axis. Thus, the shaft is supported such that it can rotate about the rotational center axis.

The bearing of the present invention and the shaft are assembled together in accordance with, for example, the following procedure.

First, the posture of the bearing is set such that the first and second bearing portions open toward directions along the shaft. In this state, the shaft is inserted into the gap.

Next, in a state in which the shaft is located within the gap, the bearing is turned such that the shaft is accommodated in the first and second bearing portions. As a result, the shaft is held by the first and second bearing portions, while being nipped from opposite sides.

After that, the engagement portion is engaged with the mount member, whereby the bearing is attached to the mount member.

The bearing of the present invention can be readily assembled onto the shaft and can produce a sufficient shaft-holding force.

For example, in the case where the shaft is long, opposite ends of the shaft are rotatably supported by the mount member, and the bearing is attached to the mount member. Thus, the shaft can be securely held on the mount member.

Further, the bearing of the present invention can support a roller which includes the above-described shaft having a small diameter, and a plurality of cylindrical rotation members each having a diameter greater than that of the shaft and provided on the shaft at intervals along the axial direction of the shaft. That is, the bearing of the present invention can be readily assembled onto a portion of the shaft exposed between adjacent ones of the cylindrical rotation members, and the bearing is attached to the mount member. Thus, the roller having the above-described structure can be securely held on the mount member.

The bearing of the present invention is preferably used for a roller (a paper feed guide roller, a registration roller, or a paper eject roller) of a paper feed system of an image forming apparatus.

Notably, a recess for holding a lubricant may be formed in the first bearing portion and/or the second bearing portion. Thus, rotation of the shaft can be made smooth.

DESCRIPTION OF THE PREFERRED EMBODIMENT

An embodiment of the present invention (the best mode contemplated by the inventors at the time of filing the present application) will next be described in detail with reference to the drawings.

<Overall Configuration of Laser Printer>

Figure 1:
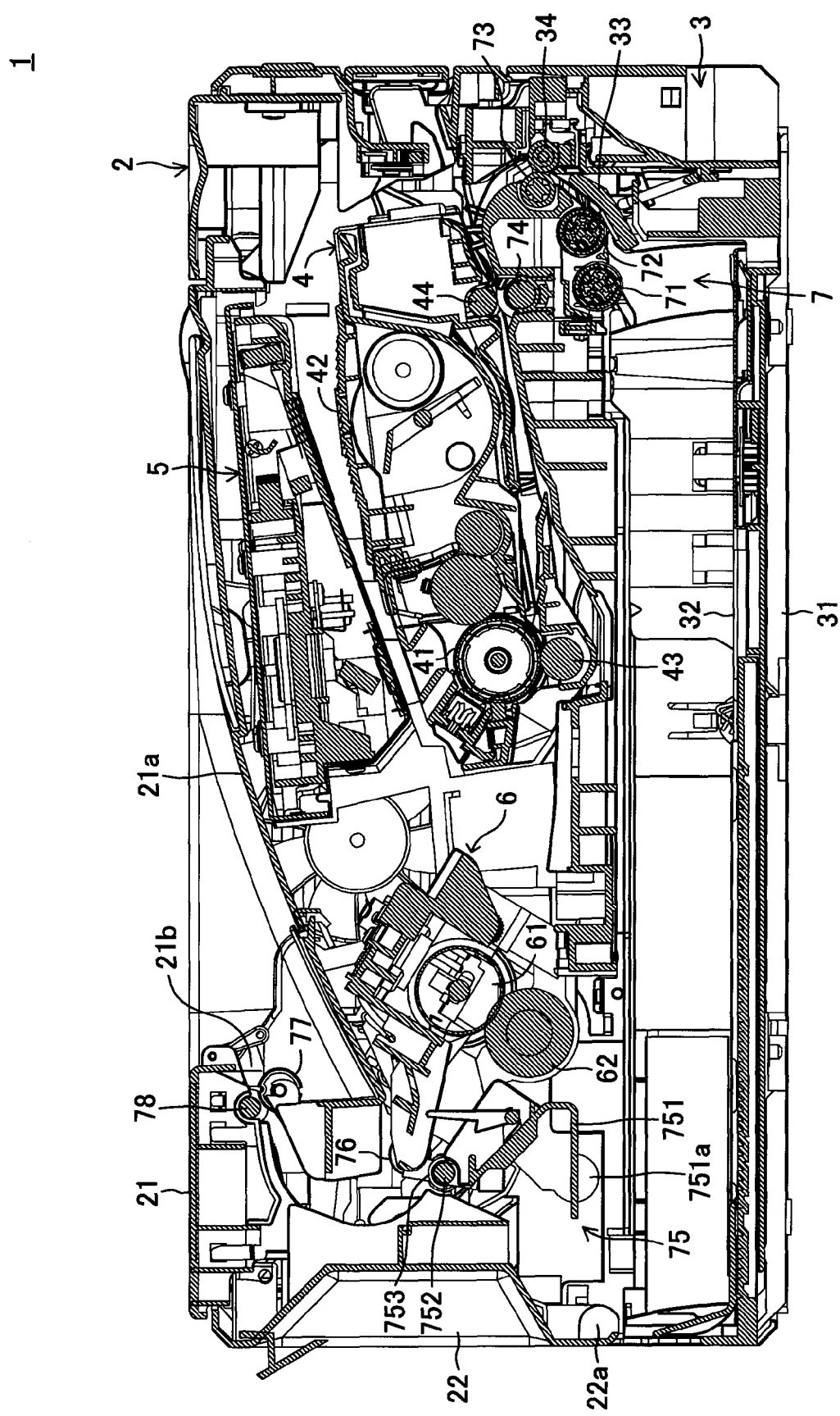
FIG. 1 is a side sectional view (a vertical sectional view taken along a paper feed direction) showing a schematic configuration of a laser printer to which an embodiment of the present invention is applied.

FIG. 1 is a side sectional view (a vertical sectional view taken along a paper feed direction) showing a schematic configuration of a laser printer 1 to which an embodiment of the present invention is applied.

Here, the right and left sides in FIG. 1 are referred to as the "front side" and "rear side," respectively. Further, the left-right direction in FIG. 1 is referred to as the front-rear direction, and a direction orthogonal to both of a vertical direction and the front-rear direction in FIG. 1 is referred to as the "width direction."

Referring to FIG. 1, the laser printer 1 includes a body casing 2, a sheet cassette 3, a process cartridge 4, a scanner unit 5, a fixation unit 6, and a paper transport section 7.

<<Body Casing>>

The body casing 2 is a box-shaped member which constitutes an outer cover of the laser printer 1, and is formed from a synthetic resin.

An upper casing 21, which constitutes the top wall of the body casing 2, has a catch tray 21a and a paper ejection opening 21b. The catch tray 21a is formed by a concave portion having an inclined surface which is formed to extend obliquely downward from the front side of the body casing 2 toward the rear side thereof. The paper ejection opening 21b, which is an aperture, is formed in a wall of the upper casing 21, the wall extending upward from a lower end portion of the catch tray 21a. That is, the catch tray 21a is configured to receive sheets of paper ejected through the paper ejection opening 21b.

Figure 2A:
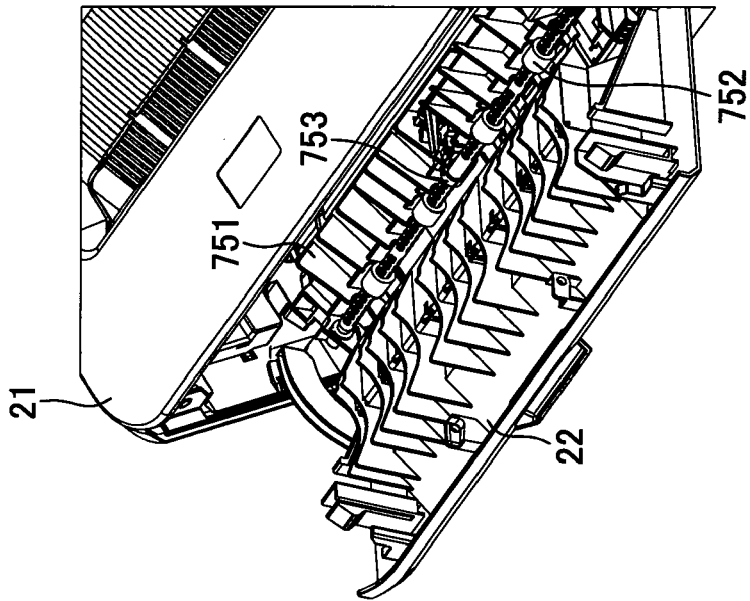
FIG. 2A is a side sectional view of the laser printer of FIG. 1 showing a state in which a rear cover is opened.
Figure 2B:
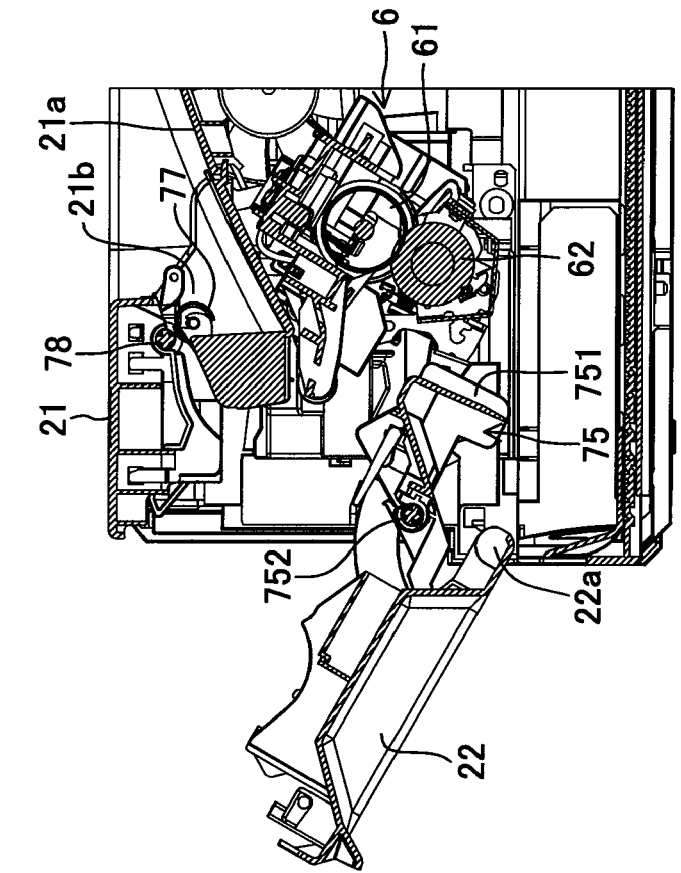
FIG. 2B is a perspective view corresponding to FIG. 2A.

A rear cover 22, which constitutes the rear wall of the body casing 2, is configured such that the rear cover 22 can open and close a rear opening of the body casing 2 through rotation about a hinge portion 22a provided at the lower end of the rear cover 22 (see FIGS. 1, 2A, and 2B). FIG. 2A is a side sectional view of the laser printer 1 of FIG. 1 showing a state in which the rear cover 22 is opened. FIG. 2B is a perspective view corresponding to FIG. 2A.

<Sheet Cassette>>

The sheet cassette 3 is configured such that it can be detachably attached to a lower portion of the body casing 2. This sheet cassette 3 includes a cassette case 31, a paper push plate 32, a separation pad 33, and a roller 34.

The cassette case 31 is an upward-opened box-shaped member, which constitutes the casing of the sheet cassette 3, and is formed from a synthetic resin. This cassette case 31 is configured to accommodate a large number of sheets of paper of up to A4-size (210 mm (width)×297 mm (length)) in a stacked condition such that the longitudinal direction of the sheets coincides with the front-rear direction.

The paper push plate 32 is disposed inside the cassette case 31. A rear end portion of the paper push plate 32 is rotatably supported by the cassette case 31. That is, the paper push plate 32 is supported by the cassette case 31 such that a front end portion of the paper push plate 32 can pivot generally vertically on the rear end portion thereof, serving as a pivot. The front end portion of the paper push plate 32 is urged upward by unillustrated urging means (a cam mechanism, spring, or the like).

The separation pad 33 is disposed in the vicinity of a front end portion of the cassette case 31 and downstream of the paper push plate 32 with respect to the paper feed direction. This separation pad 33 is urged upward by means of an unillustrated spring. A separation layer formed of a material having a friction coefficient higher than that of paper, such as rubber, is formed on the upper surface of the separation pad 33.

The roller 34 is disposed downstream of the separation pad 33 with respect to the paper feed direction. The roller 34 is rotatably supported at the front end portion of the cassette case 31.

<<Process Cartridge>>

The process cartridge 4 is accommodated within the body casing 2. The process cartridge 4 is configured to apply toner (developer) on a sheet of paper in a pattern corresponding to an image. Specifically, the process cartridge 4 includes a photosensitive drum 41, a developing unit 42, a transfer roller 43, and a registration follower roller 44.

The photosensitive drum 41 is a generally cylindrical member rotatably supported within the process cartridge 4, and is composed of a photosensitive layer which forms an outer circumferential portion of the photosensitive drum 41, and a tube which is formed of a metal such as aluminum and is disposed inside the photosensitive layer.

The developing unit 42 supplies charged toner to the surface of the photosensitive layer at the outer circumferential portion of the photosensitive drum 41, to thereby develop an electrostatic latent image formed on the surface by the toner (cause the toner to adhere to the surface in a pattern corresponding to the latent image).

The transfer roller 43 is disposed below the photosensitive drum 41 so as to face the photosensitive drum 41 with a paper transport passage intervening therebetween. The transfer roller 43 is supported within the process cartridge 4 such that the transfer roller 43 can be rotated about a rotational center shaft formed of a metal. This transfer roller 43 is fabricated by forming an electrically conductive rubber layer around the rotational center shaft formed of a metal.

A high voltage power supply is connected to the transfer roller 43. The transfer roller 43 is configured and disposed such that upon application of voltage between the photosensitive drum 41 and the transfer roller 43, toner is transferred from the circumferential surface of the photosensitive drum 41 to the surface of a sheet of paper.

The registration follower roller 44 is provided on the bottom side of the process cartridge 4. The registration follower roller 44 is rotatably supported at the bottom of the casing of the process cartridge 4. This registration follower roller 44 is disposed to face the paper feed path.

<<Scanner Unit>>

The scanner unit 5 is disposed within the body casing 2 to be located above the process cartridge 4.

This scanner unit 5 is configured to cause a laser beam, which is modulated in accordance with image data, to scan the surface of the photosensitive layer at the outer circumferential portion of the photosensitive drum 41, to thereby form an electrostatic latent image on the surface.

<<Fixation Unit>>

The fixation unit 6 is disposed within the body casing 2 to be located downstream, with respect to the paper transfer direction, of a position where the photosensitive drum 41 faces the transfer roller 43.

The fixation unit 6 is configured to apply heat and pressure to a sheet of paper having passed through the process cartridge 4 and carrying toner adhering thereto, to thereby fix a toner image, which is an image formed by the toner, onto the sheet of paper. This fixation unit 6 includes a heating roller 61 and a pressure-applying roller 62.

The heating roller 61 includes a cylindrical, tubular member formed of a metal and having a surface treated for facilitating separation of paper sheet, and a halogen lamp accommodated within the tubular member. The heating roller 61 is configured such that it can be rotated in the clockwise direction in FIG. 1. The pressure-applying roller 62, which is a roller formed of silicon rubber, is pressed against the heating roller 61 under a predetermined pressure, and rotates in the counterclockwise direction in FIG. 1 so as to follow the heating roller 61.

<<Paper Transport Section>>

The paper transport section 7 is configured as described below such that the paper transport section 7 can transfer sheets of paper along a predetermined paper feed path within the body casing 2, from the sheet cassette 3 to the catch tray 21a.

The paper transport section 7 includes a pickup roller 71, a separation roller 72, a guide roller 73, a registration drive roller 74, an image-fixed-paper guide unit 75, a guide roller 76, a paper-ejection follower roller 77, and a paper-ejection drive roller 78.

The pickup roller 71 is disposed at the bottom portion of the body casing 2 to face the front end portion of the paper push plate 32. This pickup roller 71 is configured such that it can be rotated in the counterclockwise direction in FIG. 1, to thereby feed out the leading end of a sheet of paper in the paper feed direction.

The separation roller 72 is disposed at the bottom portion of the body casing 2 to face the separation pad 33. Further, the separation roller 72 is disposed downstream of the pickup roller 71 with respect to the paper feed direction. This separation roller 72 is configured such that the leading end of the uppermost sheet of paper is nipped between the separation roller 72 (the circumferential surface thereof) and the separation pad 33, and when the separation roller 72 is rotated in the counterclockwise direction in FIG. 1, only the uppermost sheet is transported toward a position between the guide roller 73 and the roller 34.

The guide roller 73 is disposed to face the roller 34. This guide roller 73 is configured such that when rotated in the counterclockwise direction in FIG. 1, the guide roller 73 can transport the sheet of paper toward a position between the registration follower roller 44 and the registration drive roller 74, while nipping the sheet between the guide roller 73 and the roller 34.

The registration drive roller 74 is disposed to face the registration follower roller 44. Further, the registration drive roller 74 is disposed upstream, with respect to the paper feed direction, of a location where the photosensitive drum 41 and the transfer roller 43 face each other. This registration drive roller 74 cooperates with the above-described registration follower roller 44 so as to adjust the orientation of a sheet of paper and feed timing, and is configured such that it can be rotated in the counterclockwise direction in FIG. 1.

The image-fixed-paper guide unit 75 is disposed on the rear side of the fixation unit 6 and downstream thereof with respect to the paper feed direction. Further, the guide roller 76 is rotatably supported above the image-fixed-paper guide unit 75. This image-fixed-paper guide unit 75 is configured to feed, in cooperation with the guide roller 76, a sheet of paper, which has undergone a fixing process performed at the fixation unit 6, toward the paper ejection opening 21b. The structure of this image-fixed-paper guide unit 75 will be described in detail later.

The paper-ejection follower roller 77 and the paper-ejection drive roller 78 are disposed inside the body casing 2 to be located near the paper ejection opening 21b. The paper-ejection follower roller 77 is disposed below the paper-ejection drive roller 78 to face the same. This paper-ejection follower roller 77 is configured such that it can be rotated in the clockwise direction in FIG. 1.

The paper-ejection drive roller 78 is rotatably supported by the body casing 2. This paper-ejection drive roller 78 rotates in the counterclockwise direction to follow the rotation of the paper-ejection follower roller 77.

<<<Image-Fixed-Paper Guide Unit>>>

Figure 3:
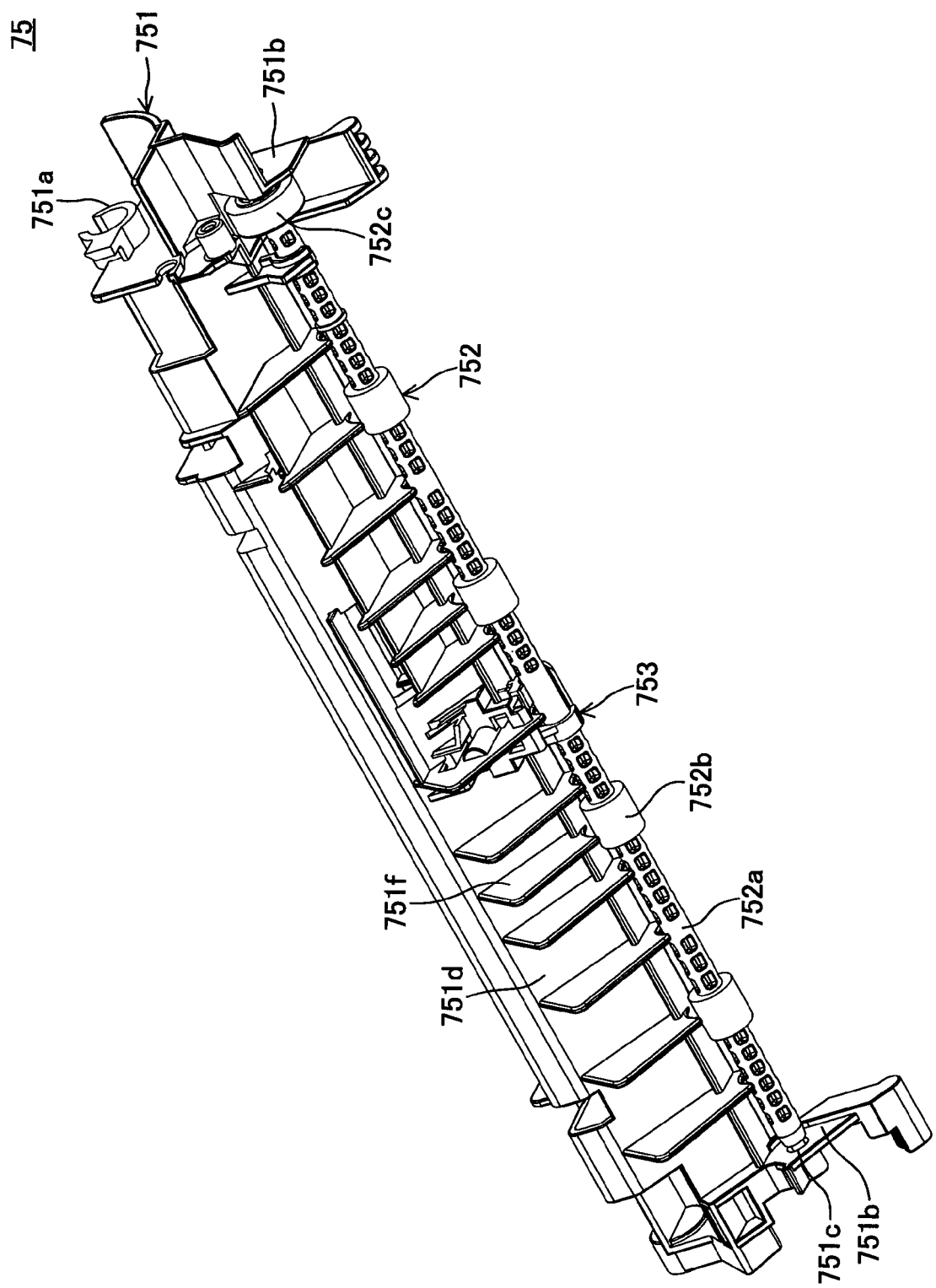
FIG. 3 is a perspective view of an image-fixed-sheet guide unit shown in FIG. 1.

FIG. 3 is a perspective view of the image-fixed-sheet guide unit 75 shown in FIG. 1. Referring to FIGS. 1 to 3, the image-fixed-sheet guide unit 75 includes a guide unit body 751, an intermediate roller 752, and a center bearing 753, which is one embodiment of the bearing of the present invention.

The guide unit body 751, which corresponds to the mount member of the present invention, is a frame formed from a plate member of a synthetic resin. A hinge portion 751a is provided at a lower end portion of the guide unit body 751 as viewed in FIG. 1. This guide unit body 751 (the image-fixed-sheet guide unit 75) is configured such that it can pivot on the hinge portion 751a (see FIGS. 1 and 2A).

That is, as shown in FIGS. 1, 2A, and 2B, the image-fixed-sheet guide unit 75 is configured such that it rotates about the hinge portion 751a in the counterclockwise direction in FIGS. 1 and 2A, as the rear cover 22 is opened or rotated about the hinge portion 22a in the counterclockwise direction in FIGS. 1 and 2A.

Side walls 751b are provided at opposite widthwise end portions of the guide unit body 751. Support holes 751c, which are through holes, are formed in the side walls 751b. Further, a beam 751d is provided between the pair of side walls 751b to extend in the width direction. A large number of guide ribs 751f for guiding paper feed project from the beam 751d.

The intermediate roller 752 is rotatably supported on the guide unit body 751. The intermediate roller 752 includes a roller shaft 752a, a plurality of rubber roller members 752b, and a gear 752c.

Figure 4:
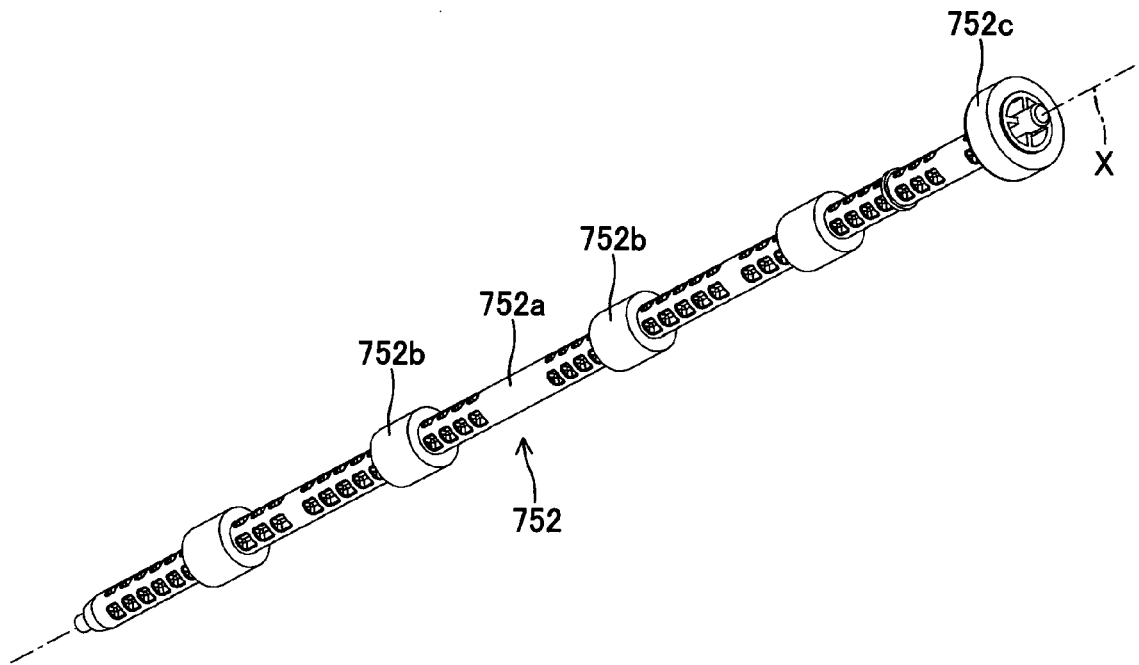
FIG. 4 is a perspective view of an intermediate roller shown in FIG. 3.

FIG. 4 is a perspective view of the intermediate roller 752 shown in FIG. 3. Referring now to FIGS. 1 to 4, the roller shaft 752a, which corresponds to the shaft of the present invention, is a bar-shaped member.

The plurality of rubber roller members 752b are fixed to the roller shaft 752a. The rubber roller members 752b are cylindrical rotational members having an outer diameter greater than that of the roller shaft 752a, and rotate together with the roller shaft 752a. The plurality of rubber roller members 752b are provided on the roller shaft 752a at predetermined intervals along the axis (the rotational center axis X shown FIG. 4) of the roller shaft 752a.

The gear 752c is fixed to one end portion of the roller shaft 752a in order to rotate the intermediate roller 752.

The center bearing 753 is attached to an approximately central portion of the roller shaft 752a to be located between adjacent rubber roller members 752b. This center bearing 753 is configured such that it can be attached to the beam 751d. The opposite end portions of the roller shaft 752a are inserted into the support holes 751c, the center bearing 753 is attached to the approximately central portion of the roller shaft 752a, and the center bearing 753 is attached to the beam 751d, whereby the intermediate roller 752 is supported for rotation about the rotational center axis X.

As shown in FIGS. 1, 2A, and 2B, the laser printer 1 of the present embodiment is configured such that when the rear cover 22 is opened, the intermediate roller 752 is exposed to the outside through the rear opening portion of the body casing 2.

<<<<Structural Details of the Center Bearing>>>>

Figure 5:
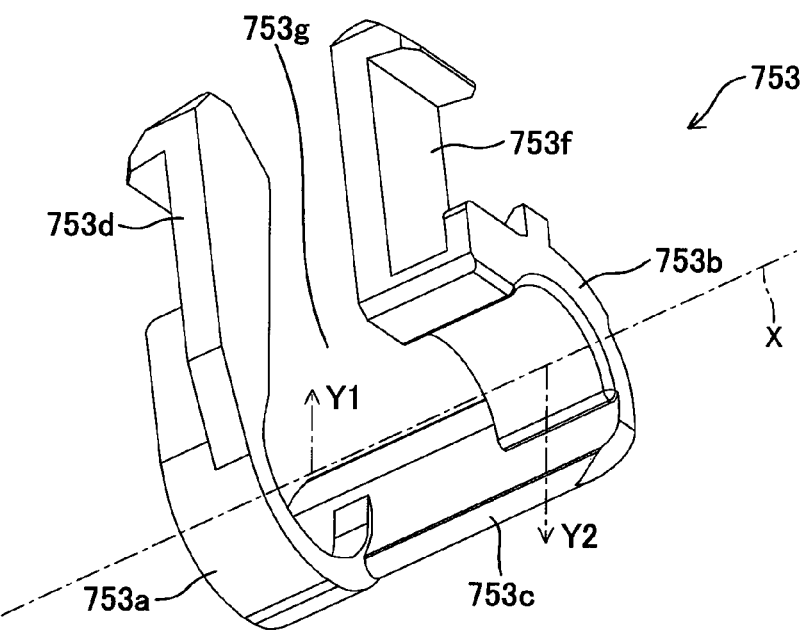
FIG. 5 is an enlarged perspective view showing a center bearing shown in FIG. 3.
Figure 6:
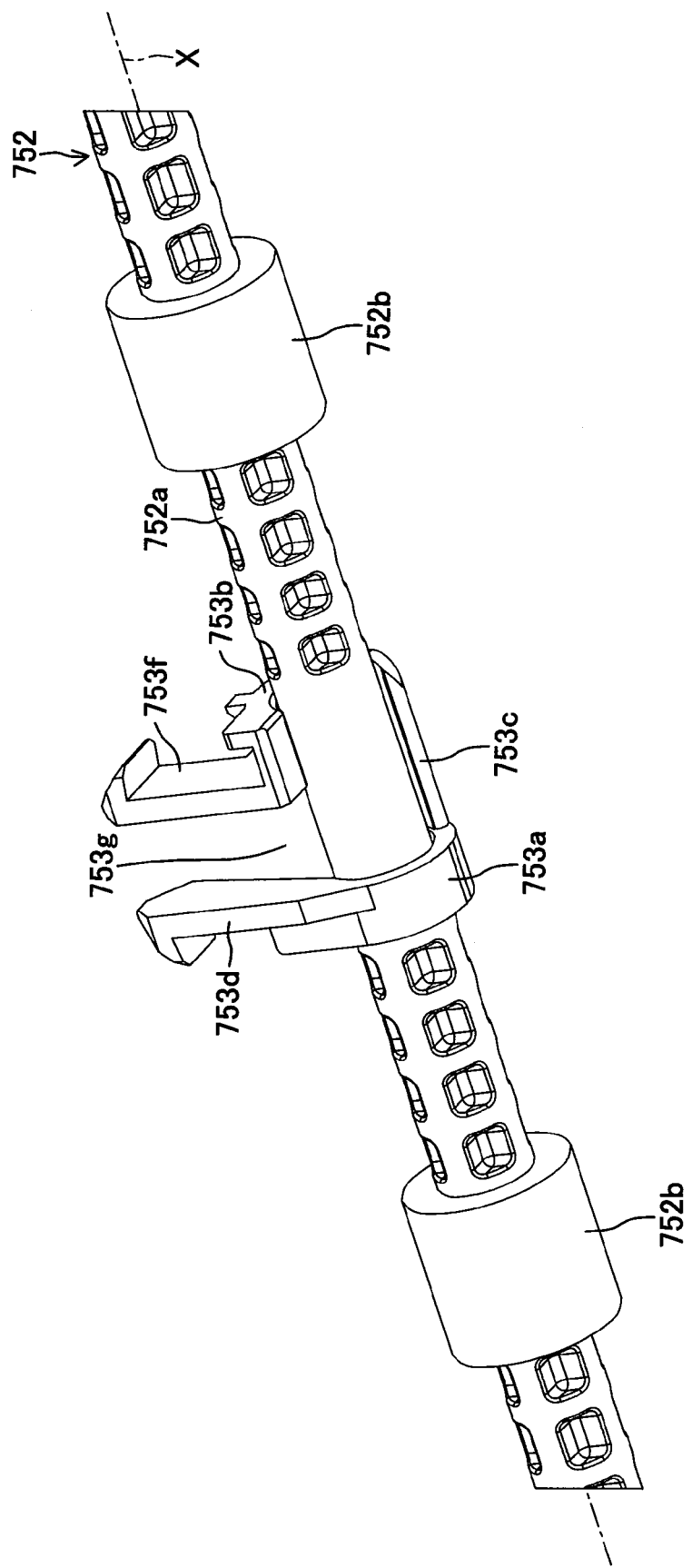
FIG. 6 is an enlarged perspective view of the center bearing and its vicinity showing a state in which the center bearing is attached to the intermediate roller shown in FIG. 4.

FIG. 5 is an enlarged perspective view of the center bearing 753 shown in FIG. 3. FIG. 6 is an enlarged perspective view of the center bearing 753 and its vicinity showing a state in which the center bearing 753 is attached to the intermediate roller 752 shown in FIG. 4.

Referring to FIGS. 5 and 6, the center bearing 753 includes a first bearing portion 753a, a second bearing portion 753b, a connection portion 753c, a first engagement portion 753d, and a second engagement portion 753f. In the present embodiment, the center bearing 753 is integrally formed of a synthetic resin.

The first bearing portion 753a is formed into a generally C-like shape such that it is opened in a first direction Y1 (see FIG. 5) perpendicular to the rotational center axis X.

The second bearing portion 753b is formed into a generally C-like shape such that it is opened in a second direction Y2 (see FIG. 5) opposite the first direction Y1. That is, the first bearing portion 753a and the second bearing portion 753b are disposed to open "in different directions" (specifically, in opposite directions).

The second bearing portion 753b is disposed such that a predetermined gap 753g is formed between the first and second bearing portions 753a and 753b along the rotational center axis X.

That is, the first and second engagement portions 753d and 753f are disposed along the rotational center axis X. The gap 753g along the rotational center axis X is present between a first end portion of the generally C-shaped first bearing portion 753a and a first end portion of the generally C-shaped second bearing portion 753b, which end portion faces the first end portion of the first bearing portion 753a.

In the present embodiment, the width of the gap 753g is slightly larger than the outer diameter of the roller shaft 752a.

The connection portion 753c connects the first and second bearing portions 753a and 753b at a position opposite the gap 753g with respect to the rotational center axis X.

The center bearing 753 is configured such that the intermediate roller 752 is rotatably supported by the first bearing portion 753a, which comes into contact with the roller shaft 752a along the first direction Y1, and the second bearing portion 753b, which comes into contact with the roller shaft 752a along the second direction Y2, opposite the first direction Y1.

The first engagement portion 753d extends in the first direction Y1 from a second end portion of the first bearing portion 753a opposite the first end portion thereof. The second engagement portion 753f extends in the second direction Y2 from a second end portion of the second bearing portion 753b opposite the first end portion thereof. The first and second engagement portions 753d and 753f are configured such that they can be engaged with the beam 751d (see FIG. 3) of the guide unit body 751.

<Method of Mounting the Intermediate Roller>

FIGS. 7 to 10 are perspective views showing an operation in which the center bearing shown in FIG. 5 is attached to the intermediate roller shown in FIG. 4, and these components are attached to the guide unit body as shown in FIG. 3. Hereinafter, the operation of attaching the center bearing 753 to the intermediate roller 752 and attaching these components to the guide unit body 751 will be described with reference to FIGS. 7 to 10.

Figure 7:
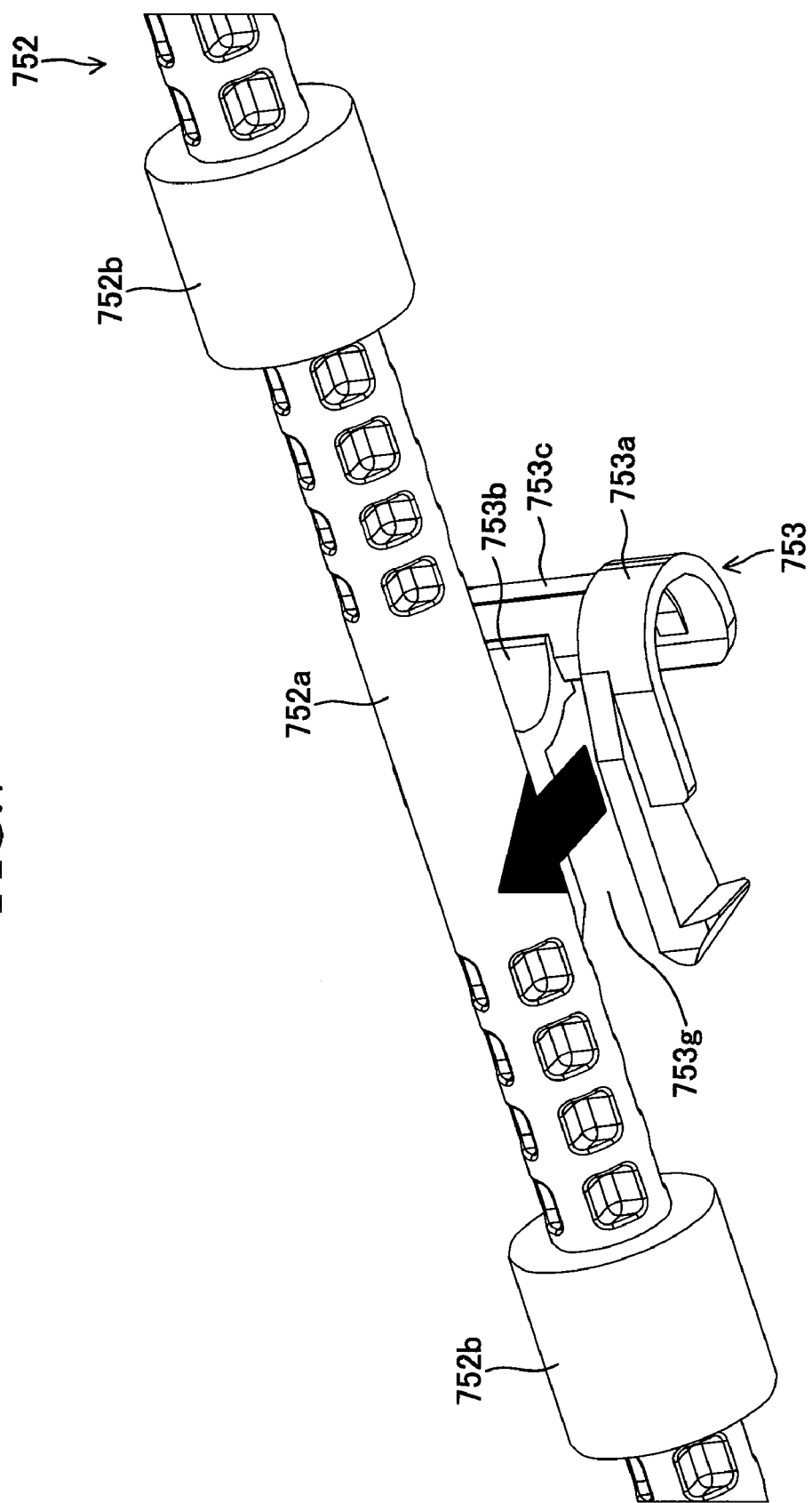
FIGS. 7 to 10 are perspective views showing an operation in which the center bearing shown in FIG. 5 is attached to the intermediate roller shown in FIG. 4, and these components are attached to the guide unit body as shown in FIG. 3.

First, as shown in FIG. 7, the center bearing 753 is held "sideways" (in a posture such that the opening directions of the first and second bearing portions 753a and 753b become parallel to the axial direction of the roller shaft 752a). Then, a substantially central portion of the intermediate roller 752 (i.e., a portion of the roller shaft 752a located between adjacent inner-side rubber roller members 752b) is inserted into the gap 753g until the central portion comes into engagement with the connection portion 753c (see the arrow in FIG. 7).

Figure 8:
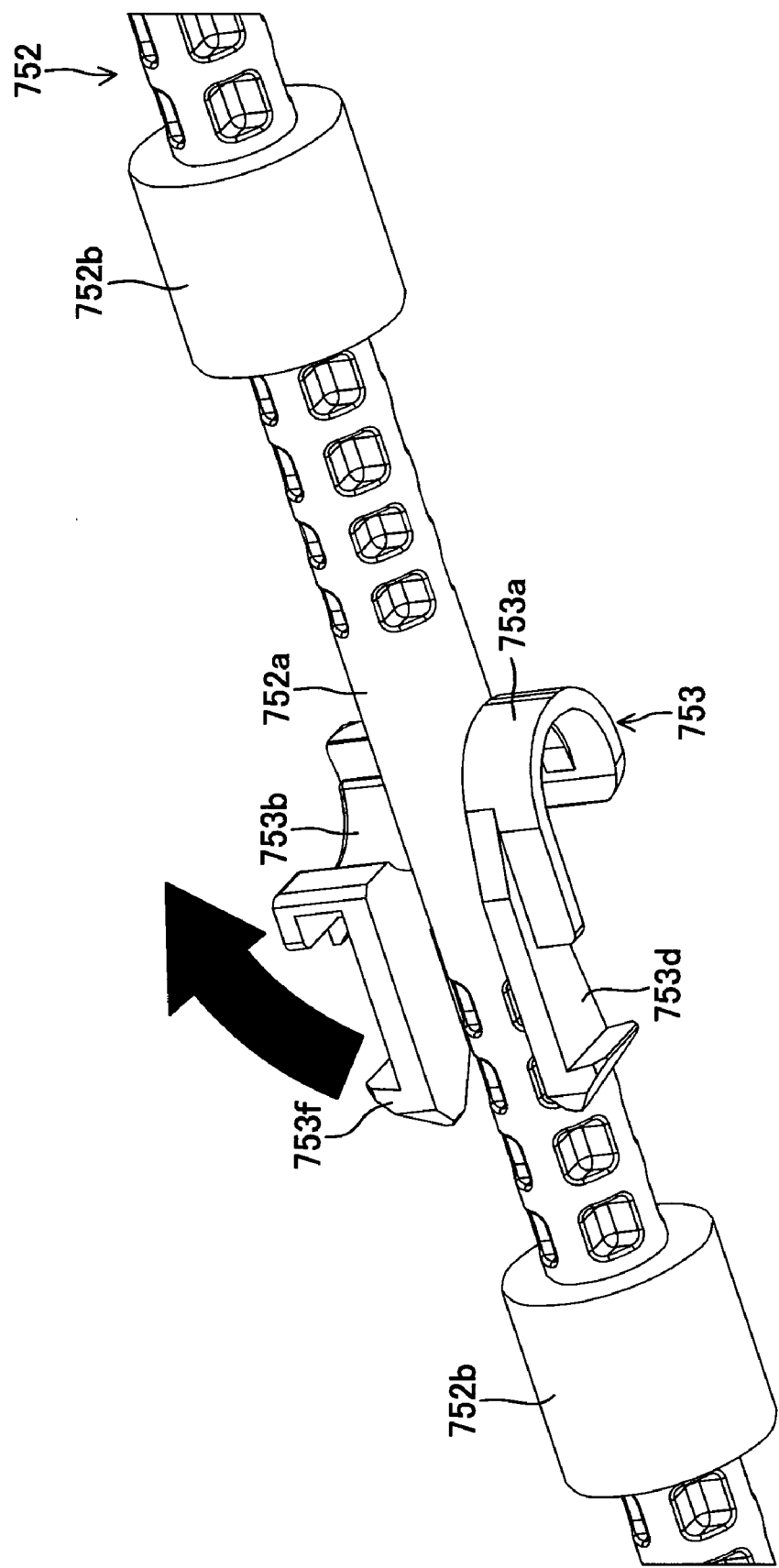

Next, as shown in FIG. 8, the center bearing 753 is rotated in the direction in which the first and second bearing portions 753a and 753b open (see the arrow in FIG. 8).

Figure 9:
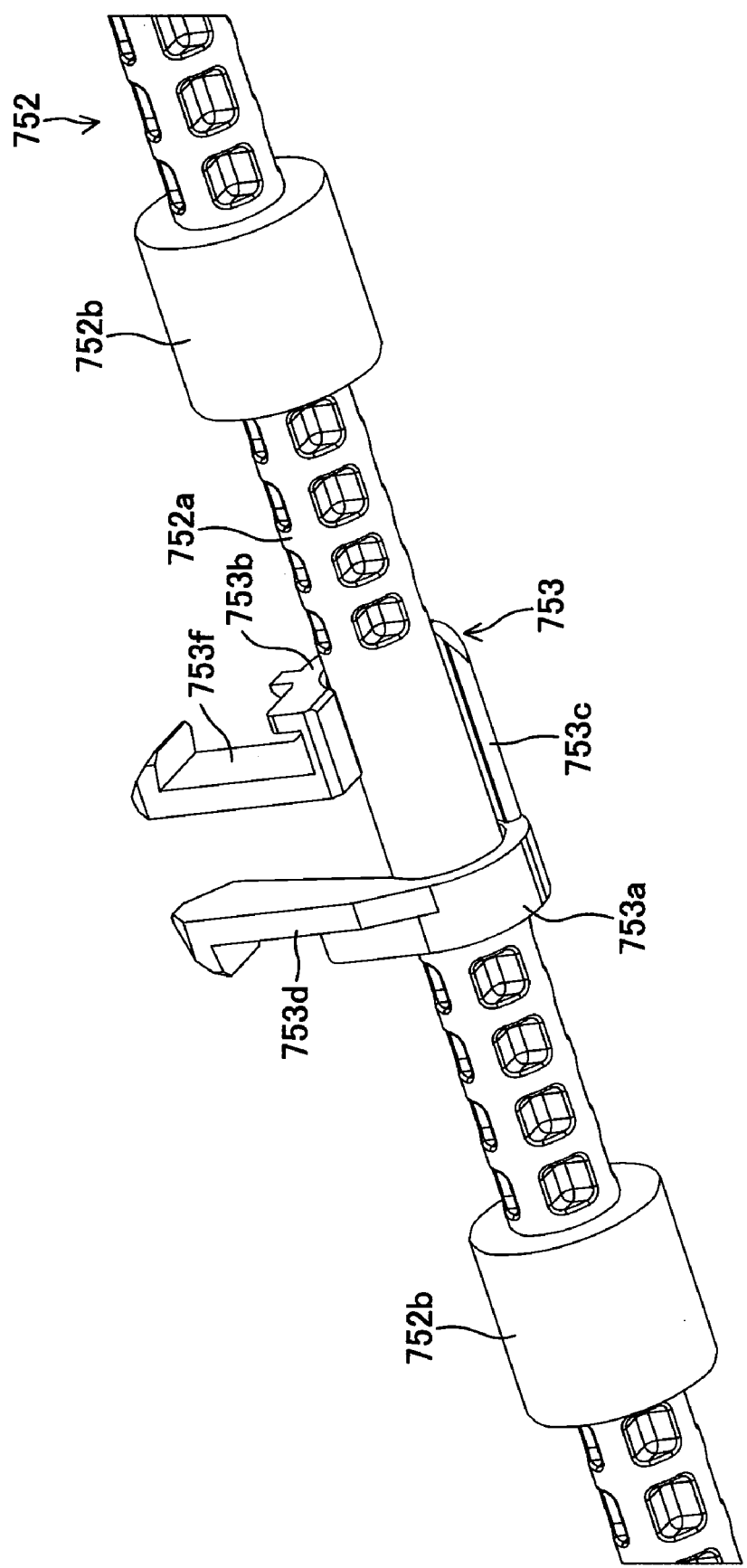

Thus, as shown in FIG. 9, the first bearing portion 753a comes into contact with the roller shaft 752a along the first direction Y1, and the second bearing portion 753b comes into contact with the roller shaft 752a along the second direction Y2, opposite the first direction Y1. As a result, the roller shaft 752a becomes able to rotate within a space defined by the first bearing portion 753a, the second bearing portion 753b, and the connection portion 753c. That is, the intermediate roller 752 is rotatably supported by the first bearing portion 753a and the second bearing portion 753b of the center bearing 753.

Figure 10:
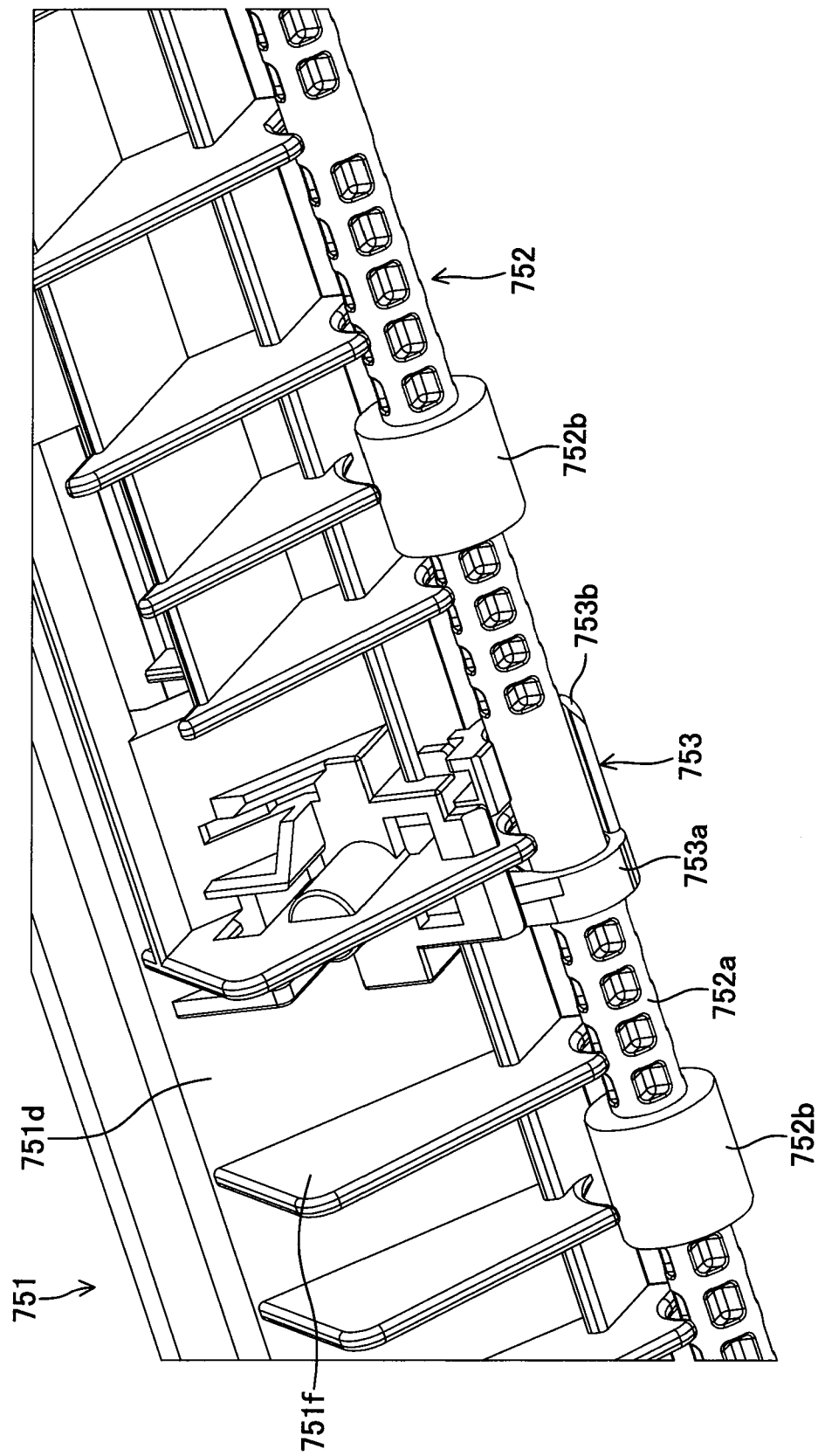

In this state, the opposite end portions of the roller shaft 752a are inserted into the support holes 751c provided in the side walls 751b of the guide unit body 751 (see FIG. 3), and the first and second engagement portions 753d and 753f are attached to the beam 751d of the guide unit body 751 (see FIG. 10).

As described above, the center bearing 753 of the present embodiment can be readily assembled into the intermediate roller 752 in which the plurality of rubber roller members (cylindrical rotation members) 752b of a large diameter are attached to the roller shaft 752a of a small diameter at intervals in the axial direction. Further, according to the center bearing 753 of the present embodiment, a substantially central portion of the intermediate roller 752 (the roller shaft 752a) is securely supported by the guide unit body 751.

That is, the center bearing 753 of the present embodiment can be readily assembled onto the intermediate roller 752, without exerting an excessive bending stress to the roller shaft 752*a*, and can hold the roller shaft 752*a* with a sufficient holding force.

<Image-Forming Operation of the Laser Printer>

Image forming operation of the laser printer 1 having the above-described configuration will briefly be described with reference to the drawings.

<<Paper Feed Operation>>

Referring to FIG. 1, sheets of paper stacked on the paper push plate 32 are biased upward toward the pickup roller 71. As a result, the uppermost one of the sheets of paper stacked on the paper push plate 32 comes into contact with the circumferential surface of the pickup roller 71. When the pickup roller 71 is rotated in the counterclockwise direction in FIG. 1, at least the uppermost sheet moves rightward in FIG. 1, and a leading end portion of at least the uppermost sheet is nipped between the separation roller 72 and the separation pad 33.

When the separation roller 72 is rotated in the counterclockwise direction in FIG. 1 with the leading end of the uppermost sheet nipped between the separation roller 72 and the separation pad 33, only the uppermost sheet is fed in the paper feed direction as the separation roller 72 rotates.

The leading end portion of the sheet fed by the separation roller 72 in the paper feed direction reaches a position between the guide roller 73 and the roller 34. Since the guide roller 73 is rotated in the counterclockwise direction in FIG. 1, the sheet is fed toward a position between the registration drive roller 74 and the registration follower roller 44.

After the leading end of the sheet comes into engagement with the contact portion (registration portion) between the registration follower roller 44 and the registration drive roller 74, the registration drive roller 74 is rotated at a predetermined timing, and the registration follower roller 44 rotates to follow the rotation of the registration drive roller 74. As a result, the sheet is fed toward a transfer position where the photosensitive drum 41 and the transfer roller 43 face each other. Thus, any skew of the sheet is corrected, and the feed timing is adjusted.

<<Development/transfer Operation>>

While the sheet is being fed toward the above-mentioned transfer position, the scanner unit 5 forms an electrostatic latent image on the circumferential surface of the photosensitive drum 41, and the developing unit 42 develops the latent image. That is, a toner image is held the circumferential surface of the photosensitive drum 41.

At the above-described transfer position, the toner on the circumferential surface of the photosensitive drum 41 is transferred to the surface of the sheet upon application of a voltage between the photosensitive drum 41 and the transfer roller 43. As a result, a toner image is formed on the surface of the sheet.

<<Fixation/paper Ejection>>

The sheet carrying the toner image is fed to the fixation unit 6, where the sheet is nipped between the heating roller 61 and the pressure-applying roller 62, whereby pressure and heat are applied to the sheet. As a result, the toner image is fixed to the surface of the sheet. After that, the sheet carrying the fixed toner image is fed toward a position between the guide roller 76 and the intermediate roller 752 of the image-fixed-paper guide unit 75.

As a result of rotation of the intermediate roller 752 in the counterclockwise direction in FIG. 1, the image-fixed paper is fed to a position between the paper-ejection follower roller 77 and the paper-ejection drive roller 78. Upon rotation of the paper-ejection follower roller 77 in the clockwise direction in FIG. 1, the image-fixed sheet is ejected through the paper ejection opening 21*b*, and is placed on the catch tray 21*a*.

<<Operation for Coping with Paper Jam at the Fixation/paper Ejection Section>>

When paper jam occurs on the rear side of the laser printer 1 (in the vicinity of the paper-ejection follower roller 77 and the exit of the fixation unit 6), as shown in FIGS. 2A and 2B, the rear cover 22 is opened. A user then pulls out a jammed sheet of paper by use of his hands. During this sheet removal operation, an approximately central portion of the intermediate roller 752 may be pulled outward.

However, in the structure of the present embodiment, the approximately central portion of the intermediate roller 752 is securely supported by the center bearing 753 attached to the guide unit body 751. Therefore, the intermediate roller 752 can be prevented from deforming or coming off the guide unit body 751, even when the intermediate roller 752 is pulled outward.

<Modifications>

The above-described embodiment is a mere example of the best mode which the inventors of the present invention contemplated at the time of filing the present application. The present invention is not limited to the above-described embodiment. Various modifications to the above-described embodiment are possible, so long as the invention is not modified in essence.

Modifications to the above-described embodiment will next be exemplified. In the following description of the modifications, members similar in structure and function to those used in the above-described embodiment are denoted by the same reference numerals as those used in the above-described embodiment. As for the description of these members, an associated description appearing in the description of the above-described embodiment can be cited, so long as no technical inconsistencies are involved.

Needless to say, modifications are not limited to those exemplified below. Also, a plurality of modifications can be combined as appropriate, so long as no technical inconsistencies are involved.

The above-described embodiment and the following modifications should not be construed as limiting the present invention (particularly, those components which partially constitute the means for achieving the object of the present invention and are described operationally or functionally). Such limiting construal unfairly impairs the interests of an applicant (who is motivated to file as quickly as possible under the first-to-file system) while unfairly benefiting imitators, and is thus impermissible.

(1) Application of the present invention is not limited to the bearing of the intermediate roller 752 between the fixation unit 6 and the paper ejection opening 21*b* of the laser printer 1.

For example, the present invention is applicable to bearings for a roller having a length corresponding to a predetermined paper width (e.g., A4 width), such as the guide roller 73, the registration drive roller 74, or the paper-ejection follower roller 77. Further, the present invention is applicable to various rollers of ink jet printers or the like.

In particular, preferably, the present invention is used as a bearing which readily and reliably supports a roller exposed to the outside when a cover of the casing is opened (a roller which is likely to be pulled by a user's hand).

(2) The first and second engagement portions 753*d* and 753*f* can be omitted. Further, an engagement portion such as the first and second engagement portions 753*d* and 753*f* can be provided at any one of the first bearing portion 753*a*, the second bearing portion 753*b*, and the connection portion 753*c*.

Figure 11:
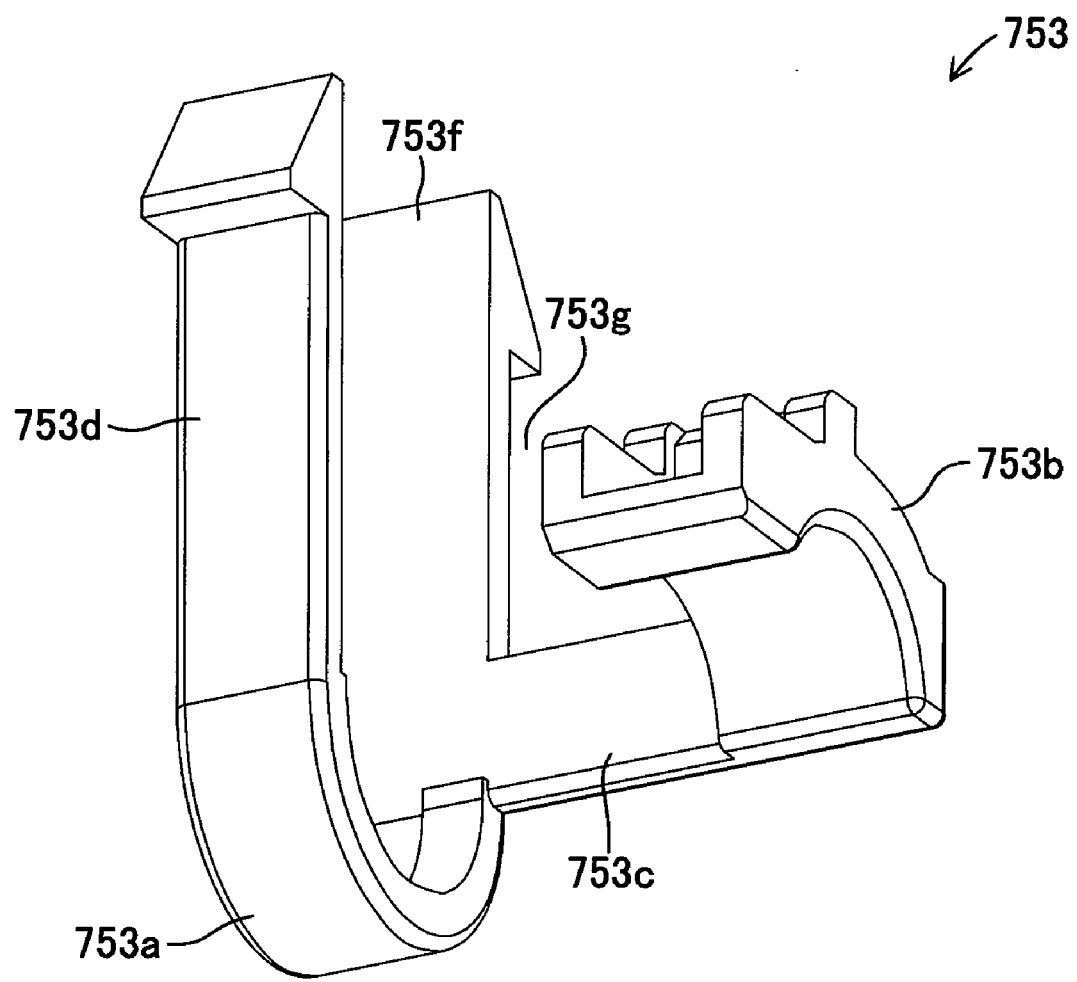
FIG. 11 is a perspective view showing the structure of one modification of the center bearing shown in FIG. 5.

FIG. 11 is a perspective view showing the structure of one modification of the center bearing 753 shown in FIG. 5. As shown in FIG. 11, both the first and second engagement portions 753*d* and 753*f* may be provided at the first bearing portion 753*a*.

The orientations of the first and second engagement portions 753*d* and 753*f* may be appropriately changed in accordance with the shape of a mount member (in the above-described embodiment, the guide unit body 751) to which the center bearing 753 is mounted.

(3) The engagement portions which are used to attach the center bearing 753 to the guide unit body 751 are not limited to projecting portions as in the above-described embodiment, and may be holes. In this case, projecting portions similar to the first and second engagement portions 753*d* and 753*f* of the above-described embodiment are provided on the guide unit body 751, and are caused to fit in the holes (engagement portions) provided in the center bearing 753.

(4) The width of the gap 753*g* may be equal to or slightly smaller than the outer diameter of the roller shaft 752*a*. In this case, the roller shaft 752*a* can be inserted into the gap 753*g* while slightly widening the gap 753*g*.

Figure 12:
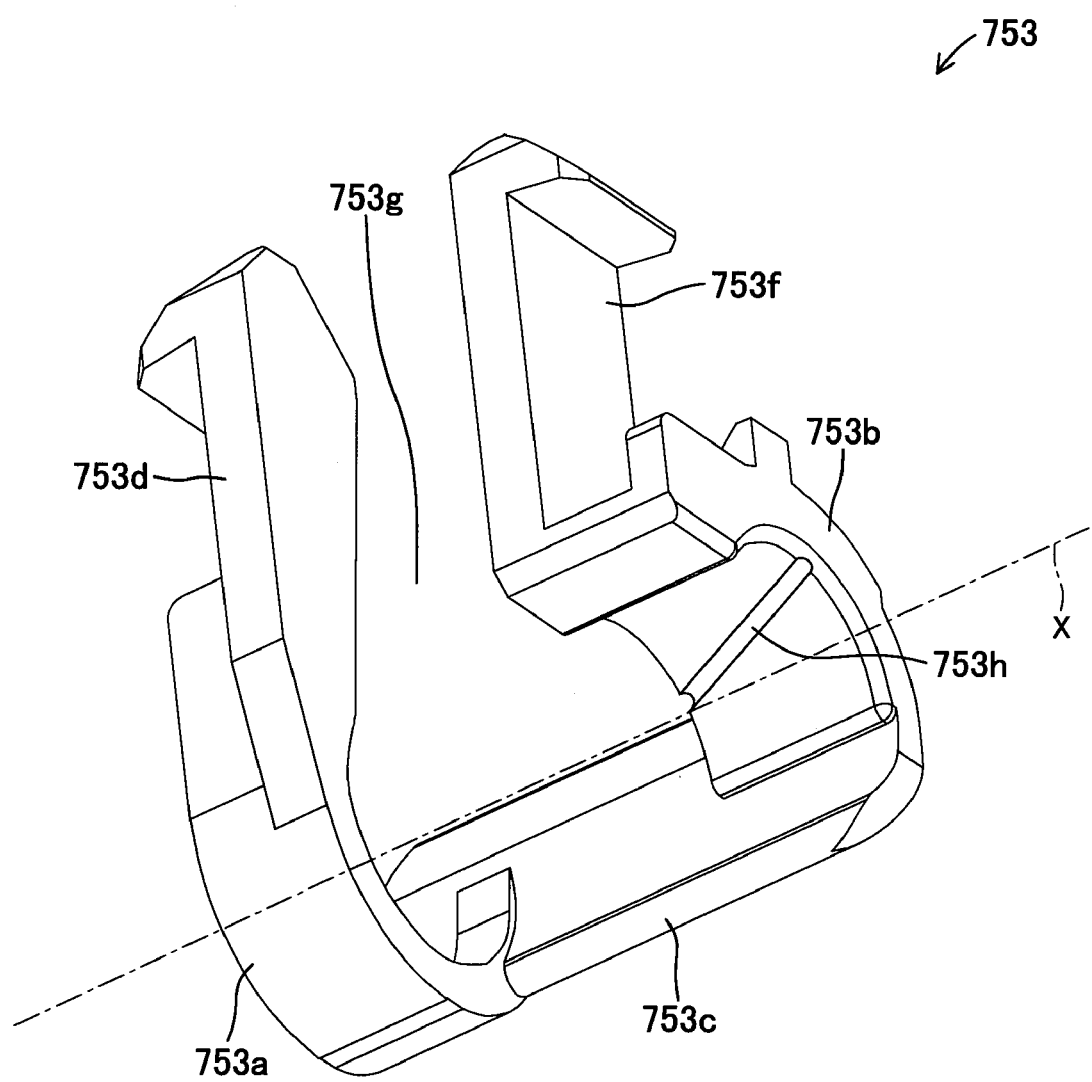
FIG. 12 is a perspective view showing the structure of another modification of the center bearing shown in FIG. 5.

(5) FIG. 12 is a perspective view showing the structure of another modification of the center bearing 753 shown in FIG. 5.

As shown in FIG. 12, a recess 753*h* may be provided on at least one (preferably, both) of the first and second bearing portions 753*a* and 753*b*. This recess 753*h* is a groove formed on the inner surface of the corresponding C-shaped bearing portion, and holds a gel lubricant (e.g., grease) therein.

As shown in FIG. 12, the recess 753*h* may extend along the rotational center axis X (parallel to the rotational center axis X or along a direction intersecting the rotational center axis X with a small angle), or may extend perpendicular to the rotational center axis X.

(6) The material of the center bearing 753 is not limited to synthetic resin, but may be metal.

(7) The relation between the opening direction of the first bearing portion 753*a* and that of the second bearing portion 753*b* is not limited to the relation employed in the above-described embodiment, in which the first and second bearing portions 753*a* and 753*b* open in opposite directions. That is, the angle formed between the first direction Y1 and the second direction Y2 (see FIG. 5) is not limited to 180 degrees, and may be any angle at which the first and second directions intersect each other.

Figure 13:
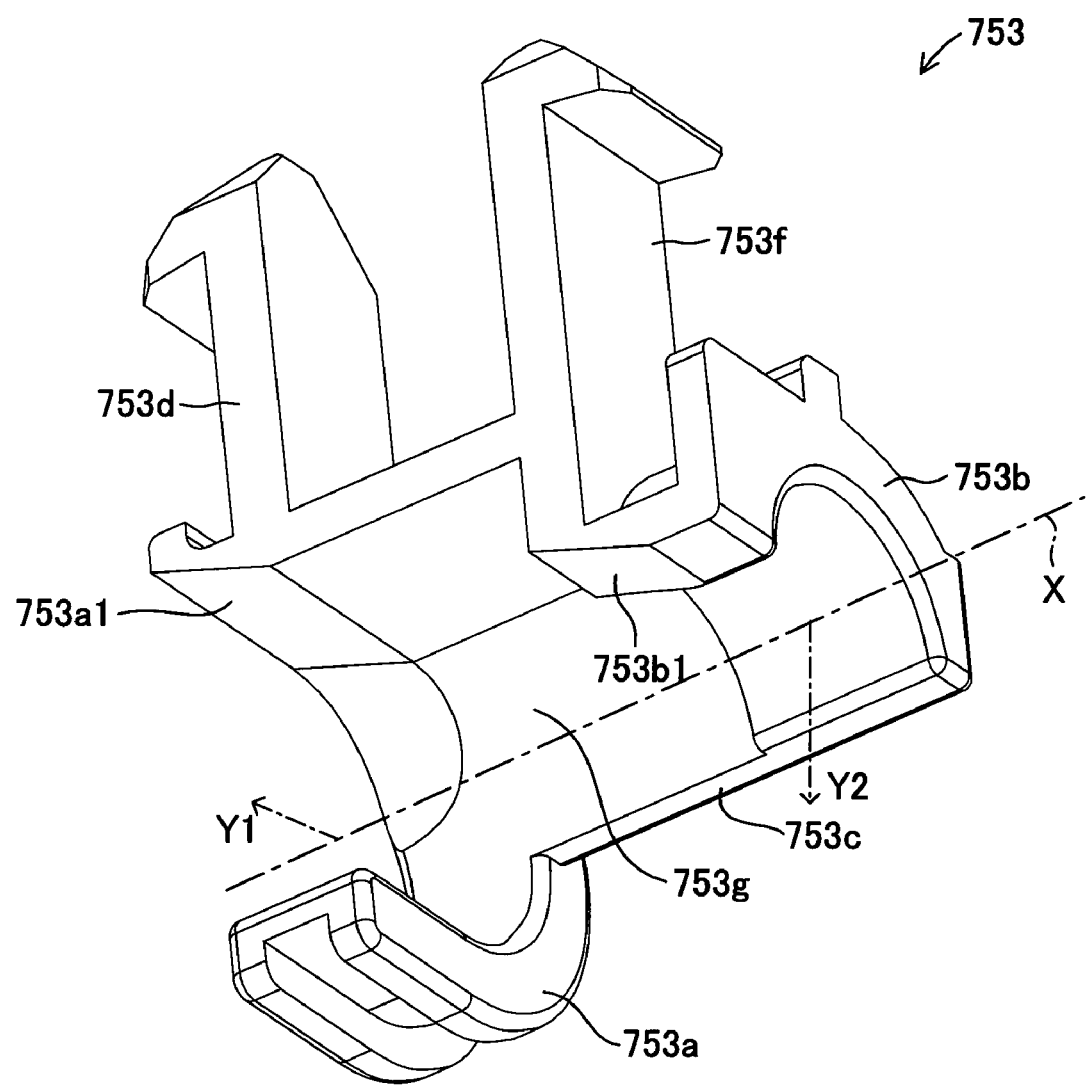
FIG. 13 is a perspective view showing the structure of still another modification of the center bearing shown in FIG. 5.

FIG. 13 is a perspective view showing the structure of still another modification of the center bearing 753 shown in FIG. 5. As shown in FIG. 13, the angle formed between the first direction Y1 and the second direction Y2 may be about 90 degrees.

In this case, preferably, an inclined portion 753*a*1 is formed at the first bearing portion 753*a*, and a chamfered portion 753*b*1 is formed at the second bearing portion 753*b*, as shown in FIG. 13.

The inclined portion 753*a*1 is provided on an end portion of the first bearing portion 753*a* away from the gap 753*g* to be located on the side opposite the opening direction of the second bearing portion 753*b*. Further, the inclined portion 753*a*1 is provided on the inner surface (the surface facing the rotational center axis X) of the first bearing portion 753*a*. This inclined portion 753*a*1 is formed such that the distance between the rotational center axis X and an inclined surface thereof increases toward the axial end.

The chamfered portion 753*b*1 is formed by partially chamfering an end portion of the second bearing portion 753*b*, the end portion being located near the gap 753*g*.

Figure 14:
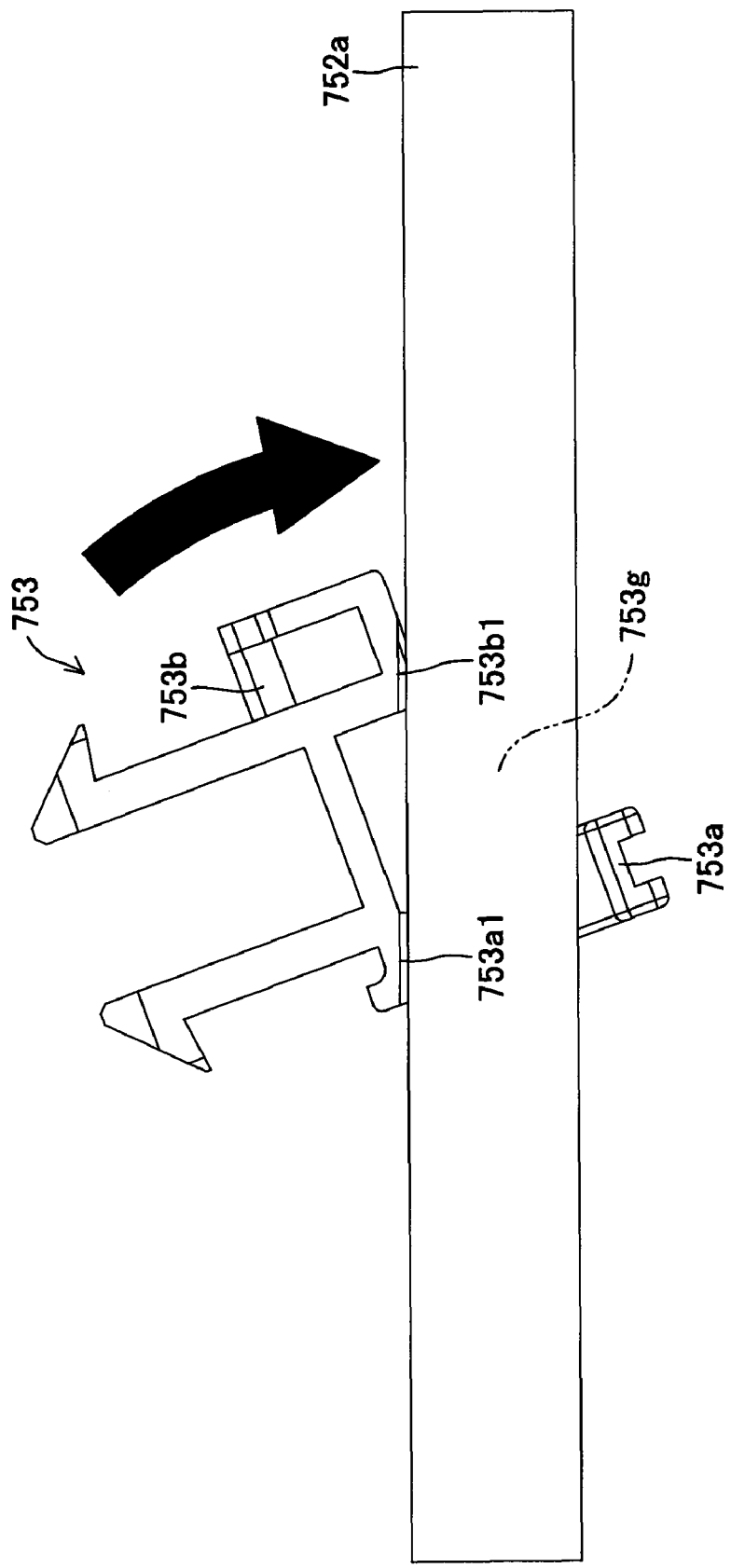
FIGS. 14 and 15A are front views showing an operation in which the center bearing shown in FIG. 13 is attached to a roller shaft.
Figure 15A:
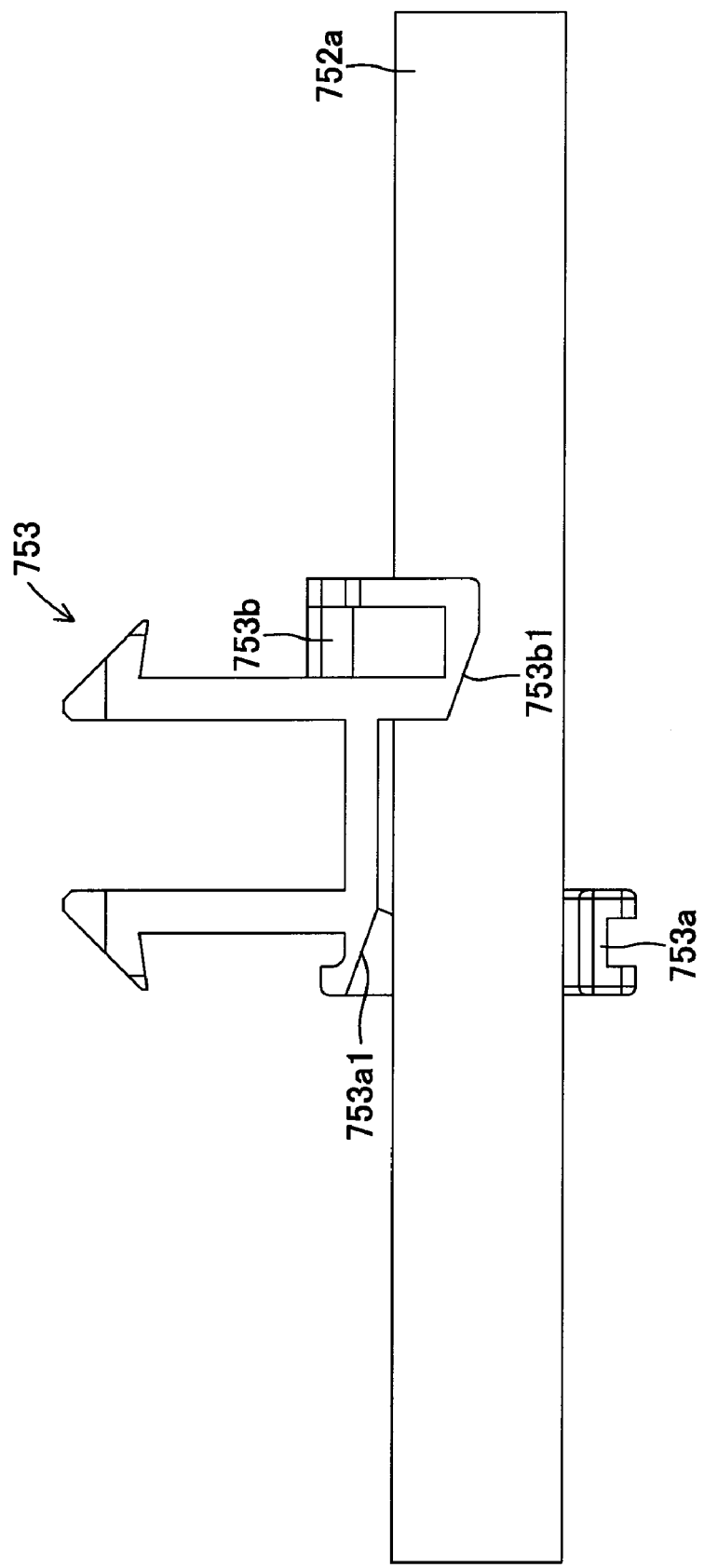
Figure 15B:
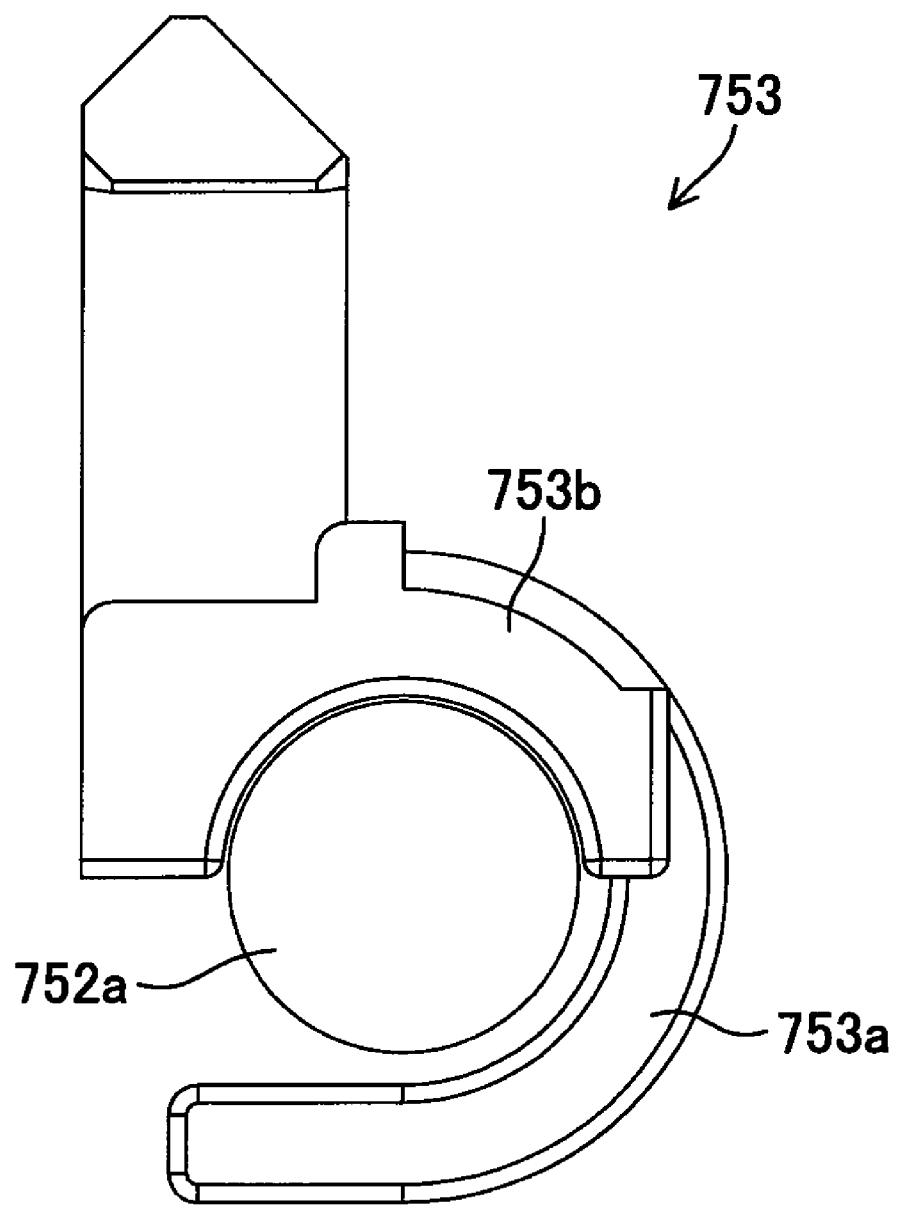
FIG. 15B is a side view corresponding to FIG. 15A.

FIGS. 14 and 15A are front views showing an operation in which the center bearing shown 753 shown in FIG. 13 is attached to the roller shaft 752*a*. FIG. 15B is a side view corresponding to FIG. 15A.

As shown in FIG. 14, the inclined portion 753*a*1 and the chamfered portion 753*b*1 are formed to have a shape such that, when the roller shaft 752*a* is inserted into the first bearing portion 753*a* and the gap 753*g*, they do not hinder the insertion of the roller shaft 752*a* or can guide the insertion of the roller shaft 752*a*.

The center bearing 753 is attached to the roller shaft 752*a* in accordance with the following procedure. First, as shown in FIG. 14, the center bearing 753 is held in an inclined posture such that the inclined portion 753*a*1 and the chamfered portion 753*b*1 extend along the surface of the roller shaft 752*a*. In this state, the roller shaft 752*a* is inserted into the first bearing portion 753*a* and the gap 753*g*.

As a result, the roller shaft 752*a* is accommodated within the first bearing portion 753*a*, while the surface of the roller shaft 752*a* faces or comes into contact with the inclined portion 753*a*1. Further, the roller shaft 752*a* passes over the chamfered portion 753*b*1 and faces the inner surface of the second bearing portion 753*b*.

Next, as shown in FIG. 14, the center bearing 753 is turned (see the arrow in FIG. 14) so that the inner surface of the second bearing portion 753*b* approaches the roller shaft 752*a*.

Thus, as shown in FIGS. 15A and 15B, the roller shaft 752*a* is supported by the first bearing portion 753*a* along the first direction Y1 (see FIG. 13), and by the second bearing portion 753*b* along the second direction Y2 (see FIG. 13) generally perpendicular to the first direction Y1.

The above-described structure reduces the amount of rotation of the center bearing 753 required to attach the center bearing 753 to the roller shaft 752*a*. Accordingly, attachment of the center bearing 753 to the roller shaft 752*a* can be performed more easily.

Notably, no limitation is imposed on the shapes of the first and second bearing portions 753*a* and 753*b*, so long as they are shaped such that, when the center bearing 753 is held in an inclined posture and the roller shaft 752*a* is inserted thereinto as shown in FIG. 14, the center bearing 753 does not hinder the insertion of the roller shaft 752*a* or can guide the insertion of the roller shaft 752*a*.

For example, the inclined portion 753*a*1 may be formed to have a concave shape. Alternatively, a portion corresponding to the inclined portion 753*a*1 may be removed.

Further, in place of the chamfered portion 753*b*1, a concave portion may be formed. Alternatively, the projection amount of the end portion of the second bearing portion 753*b* located away from the connection portion 753*c* may be reduced, whereby the chamfered portion 753*b*1 can be omitted.

(8) Those components which partially constitute the means for achieving the object of the invention and are operationally or functionally described encompass not only the specific structures disclosed in the above-described embodiment and modifications, but also any other structures that provide the same or similar operations or functions.

What is claimed is:

1. A bearing configured to support a shaft for rotation about a predetermined rotational center axis and to be attachable to a mount member, the bearing comprising:
    a first bearing portion assuming a C-shape and opening in a first direction perpendicular to the rotational center axis;
    a second bearing portion disposed such that a gap is formed between the first bearing portion and the second bearing portion along the rotational center axis, the second bearing portion assuming a C-shape and opening in a second direction different from the first direction;
a connection portion connecting the first bearing portion and second bearing portion at a position opposite the gap with respect to the rotational center axis;
a first engagement portion provided on the first bearing portion and configured to be engaged with the mount member; and
a second engagement portion provided on the second bearing portion and configured to be engaged with the mount member;
wherein the gap extends between the first engagement portion and the second engagement portion and is formed such that the shaft can pass through the gap.

2. A bearing according to claim 1, wherein the gap has a width equal to or greater than opening widths of the first bearing portion and second bearing portion.

3. A bearing according to claim 1, wherein the second direction is a direction opposite the first direction.

4. A bearing according to claim 1, wherein the second direction is a direction perpendicular to the first direction.

5. A bearing according to claim 1, wherein a recess for holding a lubricant is formed in at least one of the first bearing portion and the second bearing portion.

6. A bearing configured to support a shaft for rotation about a predetermined rotational center axis and to be attachable to a mount member, the bearing comprising:
a first bearing portion assuming a C-shape and opening in a first direction perpendicular to the rotational center axis;
a first-bearing-portion-side engagement portion provided on the first bearing portion in such a manner as to be extended along the first direction from one edge of the C-shape of the first bearing portion and configured to be engaged with the mount member;
a second bearing portion disposed such that a gap through which the shaft can pass is formed between the first bearing portion and the second bearing portion along the rotational center axis, the second bearing portion assuming a C-shape and opening in a second direction different from the first direction; and
a connection portion connecting the first bearing portion and the second bearing portion at a position which is both opposite the gap and the first-bearing-portion-side engagement portion with respect to the rotational center axis.

7. A bearing according to claim 6, wherein the second direction is opposite the first direction.

8. A bearing according to claim 6, wherein a recess configured to hold a lubricant is formed in at least one of the first bearing portion and the second bearing portion.

9. A bearing according to claim 6, further comprising a second-bearing-portion-side engagement portion provided on the second bearing portion in such a manner as to be extended along the first direction and configured to be engaged with the mount member,
wherein the gap is formed between the first-bearing-portion-side engagement portion and the second-bearing-portion-side engagement portion.

10. A bearing configured to support a shaft for rotation about a predetermined rotational center axis and to be attachable to a mount member, the bearing comprising:
a first bearing portion assuming a C-shape and opening in a first direction perpendicular to the rotational center axis;
a first-bearing-portion-side engagement portion provided on the first bearing portion in such a manner as to be extended along the first direction from one edge of the C-shape of the first bearing portion and configured to be engaged with the mount member;
a second bearing portion disposed such that a gap having a width equal to or greater than opening widths of the first bearing portion and the second bearing portion is formed between the first bearing portion and the second bearing portion along the rotational center axis, the second bearing portion assuming a C-shape and opening in a second direction different from the first direction; and
a connection portion connecting the first bearing portion and the second bearing portion at a position which is both opposite the gap and the first-bearing-portion-side engagement portion with respect to the rotational center axis.

11. A bearing according to claim 10, wherein the second direction is opposite the first direction.

12. A bearing according to claim 10, wherein a recess for holding a lubricant is formed in at least one of the first bearing portion and the second bearing portion.

13. A bearing according to claim 10, further comprising a second-bearing-portion-side engagement portion provided on the second bearing portion in such a manner as to be extended along the first direction and configured to be engaged with the mount member,
wherein the gap is formed between the first-bearing-portion-side engagement portion and the second-bearing-portion-side engagement portion.

* * * * *